US006695461B2

(12) United States Patent
Ozawa et al.

(10) Patent No.: US 6,695,461 B2
(45) Date of Patent: Feb. 24, 2004

(54) LAMP UNIT, PROJECTOR, AND FIXING METHOD OF LIGHT SOURCE LAMP AND REFLECTOR

(75) Inventors: Takaaki Ozawa, Matsumoto (JP); Yoshiji Iwadare, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/021,019

(22) Filed: Dec. 19, 2001

(65) Prior Publication Data

US 2002/0080612 A1 Jun. 27, 2002

(30) Foreign Application Priority Data

Dec. 25, 2000 (JP) ......................................... 2000-392688

(51) Int. Cl.[7] .............................................. F21V 13/00
(52) U.S. Cl. ....................... 362/268; 362/294; 362/345; 362/373
(58) Field of Search ................................. 362/268, 294, 362/310, 345, 318, 373, 367, 368; 353/119

(56) References Cited

U.S. PATENT DOCUMENTS

| | | | |
|---|---|---|---|
| 3,691,365 A | 9/1972 | Sequerra et al. | |
| 4,293,892 A | 10/1981 | Plummer | |
| 5,623,145 A | 4/1997 | Nuss | ........................... 250/330 |
| 5,676,442 A | * 10/1997 | Fujimori | ..................... 353/119 |
| 5,710,430 A | 1/1998 | Nuss | ........................ 250/358.1 |
| 5,939,721 A | 8/1999 | Jacobsen et al. | ............ 250/330 |
| 6,227,686 B1 | 5/2001 | Takahashi et al. | |
| 6,283,614 B1 | * 9/2001 | Okada et al. | ................ 362/294 |

FOREIGN PATENT DOCUMENTS

| | | |
|---|---|---|
| EP | 0 389 408 A1 | 9/1990 |
| EP | 1 006 734 A2 | 6/2000 |
| FR | 2 291 451 | 6/1976 |
| JP | 62-149160 | 9/1987 |
| JP | A 7-209352 | 8/1995 |
| JP | 08-136882 | 5/1996 |
| JP | A-8-304739 | 11/1996 |
| JP | 2000-194069 | 7/2000 |
| JP | 2000-292859 | 10/2000 |
| JP | 2002-025305 | 1/2002 |

OTHER PUBLICATIONS

Mittleman, et al., "T–Ray Imaging", IEEE Journal of Selected Topics in Quantum Electronics, vol. 2, No. 3, Sep. 1996, pp. 679–692.

Cai et al., "Coherent terahertz radiation detection: Direct comparison between free–space electro–optic sampling and and antenna detection", Applied Physics letters, vol. 23, No. 4, Jul. 27, 1998, pp. 444–446.

* cited by examiner

*Primary Examiner*—Stephen Husar
*Assistant Examiner*—Guiyoung Lee
(74) *Attorney, Agent, or Firm*—Oliff & Berridge, PLC (57) ABSTRACT

Since a light source lamp (11) and a reflector (12) of a lamp unit (10) are respectively fixed to a lamp housing (13) in a mutually independent manner, an attachment for attaching and fixing the light source lamp (11) is not necessary to be formed on the reflector (12) as an optical component, so that the shape of the reflector (12) can be simplified and accuracy of a reflection surface (121), especially at a bottom thereof, can be easily improved, thereby enhancing illumination of the lamp unit (10).

12 Claims, 7 Drawing Sheets

LAMP UNIT, PROJECTOR, AND FIXING METHOD OF LIGHT SOURCE LAMP AND REFLECTOR

BACKGROUND OF THE INVENTION

1. Field of the Invention

The present invention relates to a lamp unit, a projector and a fixing method of a light source lamp and a reflector. More specifically, it relates to a lamp unit including a light source lamp and a reflector for reflecting light beam from the light source lamp, a projector having the lamp unit and a fixing method of the light source lamp and the reflector.

2. Description of Related Art

Conventionally, a projector has been used: for presentation at conference, scientific society and exhibition. Such projector modulates a light beam irradiated by a lamp unit in accordance with image information to form an optical image and to enlarge and project the optical image.

The lamp unit includes a light source lamp having a light emitting portion for irradiating the light beam, and a substantially conic (cup-shaped) reflector for reflecting the light beam from the light emitting portion. The light source lamp is directly fixed at the bottom of the reflector by cement etc. with the light emitting portion being disposed at substantially the same position as the focus of the reflector so that the light emitting portion and neighborhood thereof are accommodated in the reflector.

However, since an attachment for attaching and fixing the light source lamp has to be formed at the bottom of the above-described lamp unit, the configuration of the reflector becomes complicated and accuracy of the reflection surface is difficult to be improved.

Further, since the attachment is formed on the reflector as an optical component, considering the accuracy of the reflection surface of the reflector etc., it is difficult for the so attachment to have the most appropriate shape for holding and fixing the light source lamp, i.e. a complicated shape, so that the light source lamp may not be sufficiently held.

SUMMARY OF THE INVENTION

An object of the present invention is to provide a lamp unit, a projector and a fixing method of light source lamp and reflector capable of improving accuracy of the reflector and capable of sufficiently holding the light source lamp.

In order to attain the above object, a lamp unit according to an aspect of the present invention includes following arrangement.

A lamp unit according to the present invention includes: a light source lamp having a light emitting portion; a reflector disposed with the light emitting portion and a fixing portion thereinside that reflects a light beam irradiated by the light emitting portion; and a fixing member to which fixes the fixing portion of the light source lamp and the reflector are fixed; the light source lamp and the reflector being respectively fixed to the fixing member in a mutually independent manner, and a portion of the light source lamp between the fixing portion and the light emitting portion being exposed to an outside of the reflector.

The fixing member may be formed as an integrated member or, alternatively, may be divided in plural.

Since the light source lamp and the reflector are respectively independently fixed to the fixing member in the present invention, the attachment for attaching and fixing the light source lamp is not necessary to be formed on the reflector as an optical component. Accordingly, the shape of the reflector can be simplified and the accuracy of the reflection surface thereof can be easily improved, thereby enhancing illumination of the lamp unit.

Since the light source lamp is attached to the fixing member, unlike the conventional arrangement where the shape of the attachment has to be determined considering accuracy of the reflector etc., the attachment structure (a structure corresponding to the attachment of the conventional reflector) having the most suitable shape for supporting and fixing the light source lamp can be easily formed on the fixing member, thereby sufficiently supporting the light source lamp.

Since the portion between the light emitting portion and the fixing portion of the light source lamp, in other words, the portion disposed adjacent to the light emitting portion and of which temperature is easily raised in lighting the light source lamp, is exposed to the outside of the reflector, thereby allowing the heat to escape from the portion. Accordingly, the portion can be easily cooled, so that the temperature of the light emitting portion can be prevented from becoming too high, thereby lengthening the life of the light source lamp.

Incidentally, since the light emitting portion and the neighborhood of the light emitting portion of the light source lamp are conventionally accommodated in the reflector, the temperature of the light source lamp is likely to become high when the lamp is lit and the light source lamp's life is likely to be shortened On the other hand, since the light source lamp is fixed to the fixing member in the present invention, the portion remote from the light emitting portion (fixing portion) can be supported and fixed and the portion between the light emitting portion and the fixing portion can be exposed to the outside of the reflector.

In the lamp unit according to the present invention, a protective light transmitting member may preferably be provided on a light-emitting side of the reflector.

Since the light-emitting side of the reflector is covered with the light transmitting member, even when the light source lamp is exploded, the fragment can be prevented from scattering to the outside of the reflector.

The light transmitting member of the lamp unit according to the present invention may preferably be divided in plural parts.

Since the light transmitting member is divided in plural, i.e. composed of, for instance, a plurality of small glass plates, when the temperature inside the reflector is raised in accordance with temperature increase of the light source lamp in lighting, the crack of the light transmitting member on account of thermal deformation and the crack of the light transmitting member caused by fissure generated in processing the insert hole on the light transmitting member can be prevented.

In the lamp unit of the present invention, the light transmitting member may preferably be fixed to the fixing member.

Since the light transmitting member is fixed to the fixing member, the attachment process thereof can be facilitated as compared to an arrangement attaching the light transmitting member to the reflector.

Especially, since a troublesome process for attaching, for instance, adjacently-located small glass plates one by one is accompanied when the separate type light transmitting member is used, workability of the process can be improved by attaching the light transmitting member to the fixing member.

In the lamp unit according to the present invention, the fixing member may preferably comprise a holder to which the fixing portion of the light source lamp is fixed and held and an air circulation channel may preferably penetrate the holder Since an air circulation channel is provided to the holder of the fixing member, the fixing portion of the light source lamp fixed and held by the holder can be efficiently cooled, thereby lengthening the life of the light source lamp.

Since the air circulation channel is formed on the holder of the fixing member, the shape of the reflector can be prevented from being too complicated and the air circulation channel can be easily formed.

On the other hand, in order to attain an object of the present invention, a projector according to another aspect of the present invention is characterized in having the above lamp unit.

According to the present aspect of the present invention, the above lamp unit is attached to the projector, thereby obtaining the same effects and advantages as the above.

In order to attain an object of the present invention, a fixing method of light source lamp and reflector and assembling method of lamp unit according to still another aspect of the present invention is conducted according to following steps.

A fixing method of a light source lamp and a reflector according to the above aspect of the present invention includes the steps of: fixing one of the light source lamp and the reflector to a fixing member; positioning the other one of the light source lamp and the reflector relative to the one of the light source lamp and the reflector; and fixing the other one of the light source lamp and the reflector to the fixing member in a mutually independent manner.

An assembling method of a lamp unit including a light source lamp that irradiates light beam and a reflector that reflects the light beam from the light source lamp is characterized in including the steps of: fixing one of the light source lamp and the reflector to a fixing member; positioning the other one of the light source lamp and the reflector relative to the one of the light source lamp and the reflector; and fixing the other one of the light source lamp and the reflector to the fixing member in a mutually independent manner.

According to the above aspect of the present invention, since the light source lamp and the reflector are respectively independently fixed to the fixing member, the attachment for attaching and fixing the light source lamp as mentioned in the background art section is not necessary to be formed on the reflector as an optical component. Accordingly, the shape of the reflector can be simplified and the accuracy of the reflection surface thereof can be easily improved, thereby enhancing illumination of the lamp unit.

Since the light source lamp is attached to the fixing member, unlike the conventional arrangement where the shape of the attachment has to be determined considering accuracy of the reflector etc., the attachment structure (a structure corresponding to the attachment of the conventional reflector) having the most suitable shape for supporting and fixing the light source lamp can be easily formed on the fixing member, thereby sufficiently supporting the light source lamp.

Further, since the light source lamp and the reflector are respectively positioned relative to the fixing member, positioning freedom of the respective components can be enhanced as compared to the conventional lamp unit having a light source lamp integrally attached with the reflector, thereby facilitating to enhance the illumination of the lamp unit.

DETAILED DESCRIPTION OF PREFERRED EMBODIMENT(S)

An embodiment of the present invention will be described below with reference to attached drawings.

[1. Overall Description of Optical Unit of Projector]

Figure 1:
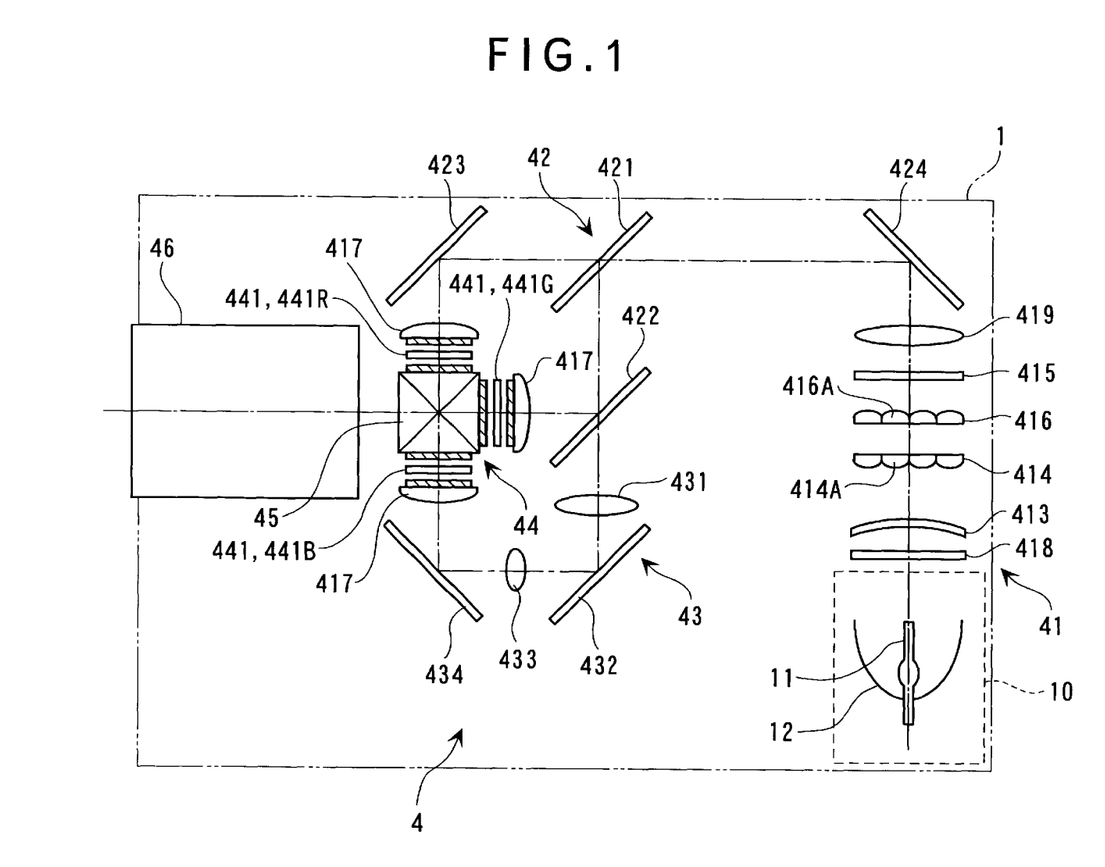
FIG. 1 is a plan view schematically showing an optical system of a projector according to an embodiment of the present invention.

FIG. 1 schematically shows an optical unit 4, used in a projector 1 according to an embodiment of the present invention.

The optical unit 4 optically processes the light beam irradiated by the light source to form an optical image corresponding to the image information, which includes an integrator illuminating optical system 41, a color separating optical system 42, a relay optical system 43, an electric optical device 44, a cross dichroic prism 45 and a projection lens 46.

The integrator illuminating optical system 41 is an optical system for illuminating the image formation areas of the three liquid crystal panels 441 (respectively represented as liquid crystal panels 441R, 441G and 441B for each color light of red, green and blue), which includes a lamp unit 10, a UV filter 418, a first lens array 414, a second lens array 416, a polarization converter 415, a superimposing lens 419 and a reflection mirror 424.

The lamp unit 10 has a light source lamp 11 as a radial light source for emitting radial light beam, a reflector 12 for reflecting the radial light emitted by the light source lamp 11 and a below-described lamp housing 13 (see FIG. 2 et seq.) as a fixing member. A halogen lamp, a metal halide lamp, or a high-pressure mercury lamp is often used as the light source lamp 11. A parabolic mirror is used as the reflector 12.

The structure of the lamp unit 10 will be described below in detail.

The first lens array 414 has a matrix arrangement of lenses 414A having substantially rectangular profile viewed from optical axis direction. The respective lenses 414A split the beam emitted from the light source lamp 11 and passed the UV filter 418 into a plurality of partial light beams. The profile of the respective lenses 414A is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 416 has approximately the same arrangement as the first lens array 414, where lenses 416A are disposed in matrix. The second lens array 416 focuses the image from the respective lenses 414A of the first lens array 414 onto the liquid crystal panel 441 as well as the superimposing lens 419.

The polarization converter 415 is disposed between the second lens array 416 and the superimposing lens 419 for converting the light from the second lens array 416 to a single polarized light in order to enhance utilization efficiency of the light in the electric optical device 44.

Specifically, the respective partial light converted into single polarized light by the polarization converter 415 is substantially superimposed on the liquid crystal panel 441R, 441G and 441B of the electric optical device 44 by the superimposing lens 419 Since the projector 1 (the electric optical device 44) of the present embodiment using a liquid crystal panel 441 for modulating polarized light can use only single polarized light, approximately half of the light from the light source lamp 11 emitting random polarization light of other type cannot be utilized.

Accordingly, by using the polarization converter 415, all of the light emitted by the light source lamp 11 is converted into single polarized light to enhance utilization efficiency of the light in the electric optical device 44. Incidentally, such polarization converter 415 is disclosed in, for instance, Japanese Patent Laid-Open publication No. Hei 8-304739.

The color separating optical system 42 has two dichroic mirrors 421 and 422 and a reflection mirror 423, where the dichroic mirrors 421 and 422 separate the plurality of partial light beam irradiated by the integrator illumining optical system 41 into three color lights of red, green and blue.

The relay optical system 43 includes an incident-side lens 431, a relay lens 433 and reflection mirrors 432 and 434, which introduces blue light of the color lights separated by the color separating optical system 42 into the liquid crystal panel 441B.

At this time, the blue color light component and the green light component of the light beam irradiated by the integrator illuminating optical system 41 are reflected by the dichroic mirror 421 of the color separating optical system 42 and the red color light component transmits through the dichroic mirror 421. The red color light transmitted through the dichroic mirror 421 is reflected by the reflection mirror 423 to reach to the liquid crystal panel 441R for red-color through a field lens 417. The field lens 417 converts the respective partial light beam emitted through the second lens array 416 into a light beam parallel to central axis thereof (main beam). The field lenses 417 provided in front of the other liquid crystal panels 441G and 441B function in the same manner.

In the blue light and the green light reflected by the dichroic mirror 421, the green light is reflected by the dichroic mirror 422 to reach the liquid crystal panel 441G for green color through the field lens 417. On the other hand, the blue color transmits through the dichroic mirror 422 to pass the relay optical system 43 and reach the liquid crystal panel 441B for blue color through the field lens 417. Incidentally, the relay optical system 43 is used for the blue color in order to prevent decrease in light utilization efficiency on account of light diffusion, because the length of the optical path of the blue color light is longer than the length of the optical path of the other color lights, in other words, in order to directly transmit the partial light beam incident on the incident-side lens 431 to the field lens 417.

The electric optical device 44 has the liquid crystal panels 441R, 441G and 441B as three optical modulators which, for instance, use a polysilicon TFT as switching element. The color lights separated by the color-separating optical systems 42 are modulated by the three crystal panels 441R, 441G and 441B in accordance with image information to form an optical image.

The cross dichroic prism 45 combines the images modulated for respective color lights irradiated from the three liquid crystal panels 441R, 441G and 441B to form a color image.

Incidentally, a dielectric multilayer film for reflecting red light and another dielectric multi-layer film for reflecting blue light are formed on the prism 45 along boundaries of the four right-angled prisms, the dielectric multilayers combining three color lights. The color image combined by the prism 45 is irradiated from the projection lens 46 and is enlarged and projected on a screen.

[2. Structure of Lamp Unit]

Figure 2:
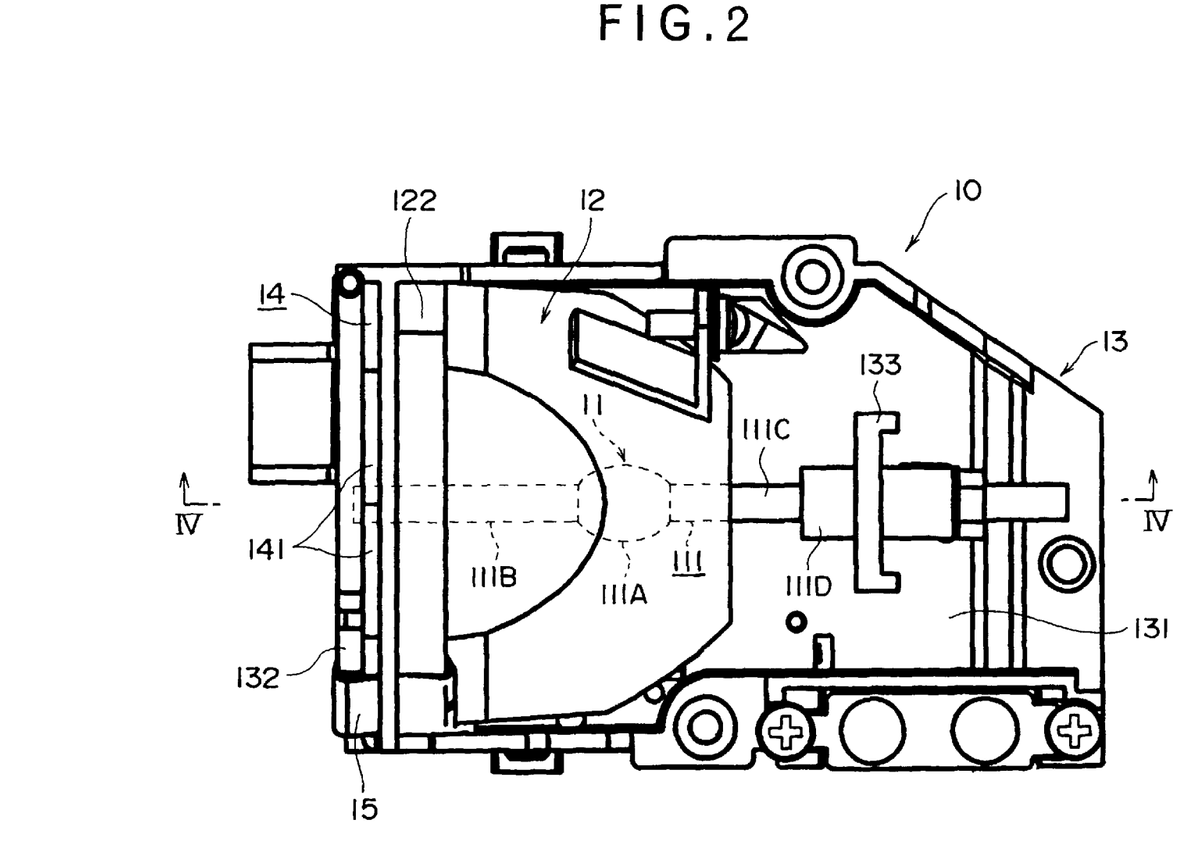
FIG. 2 is a plan view showing the lamp unit of the aforesaid embodiment.
Figure 3:
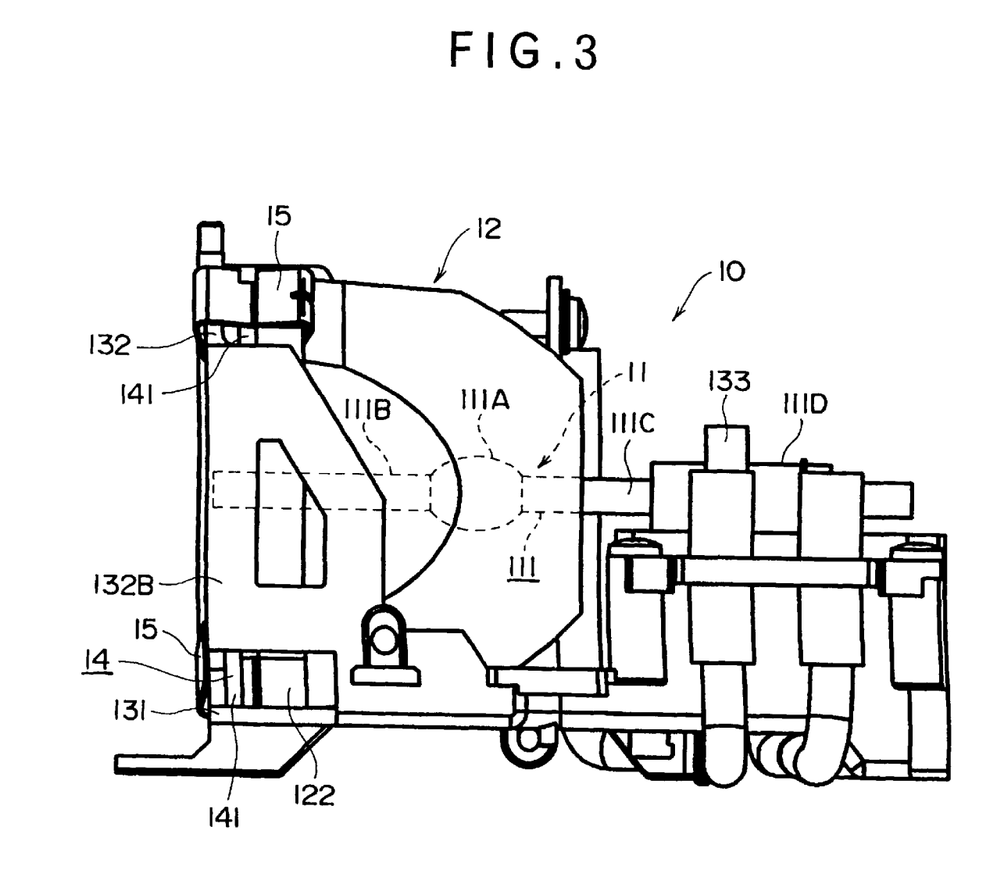
FIG. 3 is a side elevational view showing the lamp unit of the aforesaid embodiment.
Figure 4:
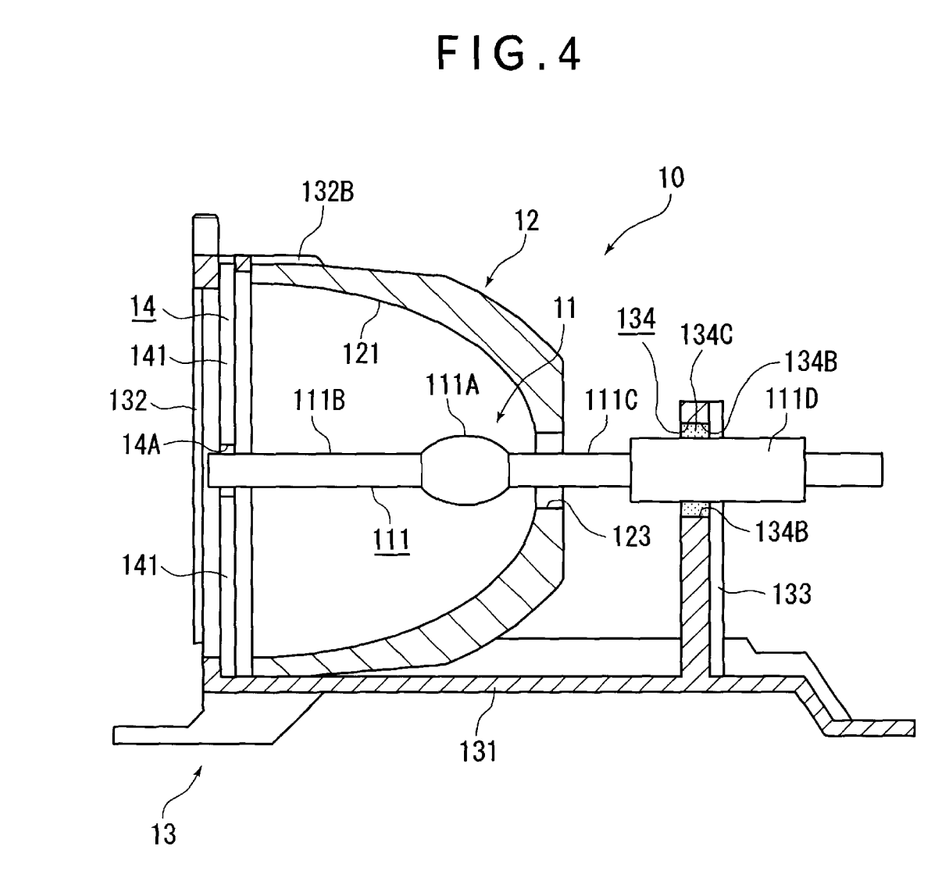
FIG. 4 is a cross section taken along IV—IV line of FIG. 4.
Figure 5:
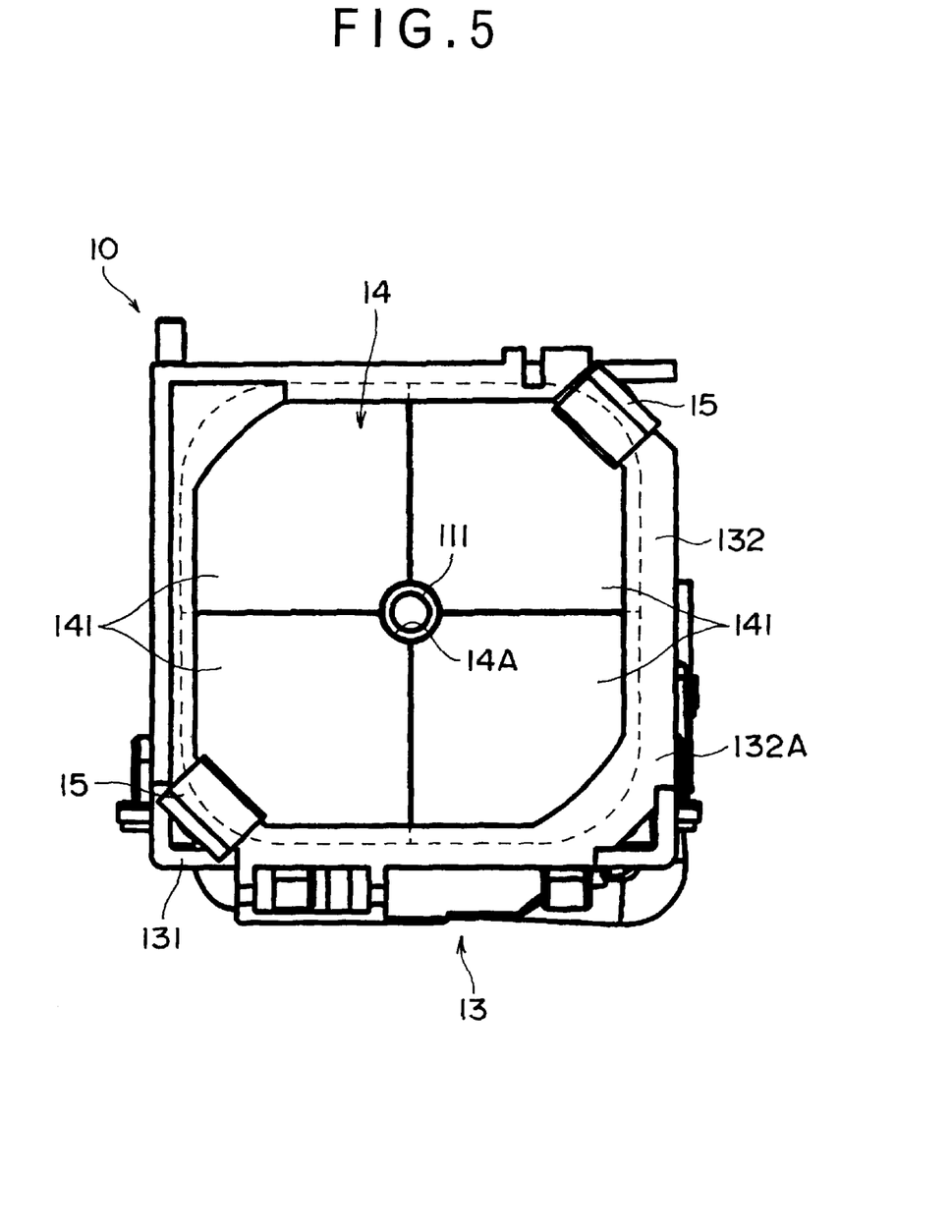
FIG. 5 is a front elevational view showing the lamp unit of the aforesaid embodiment.
Figure 6:
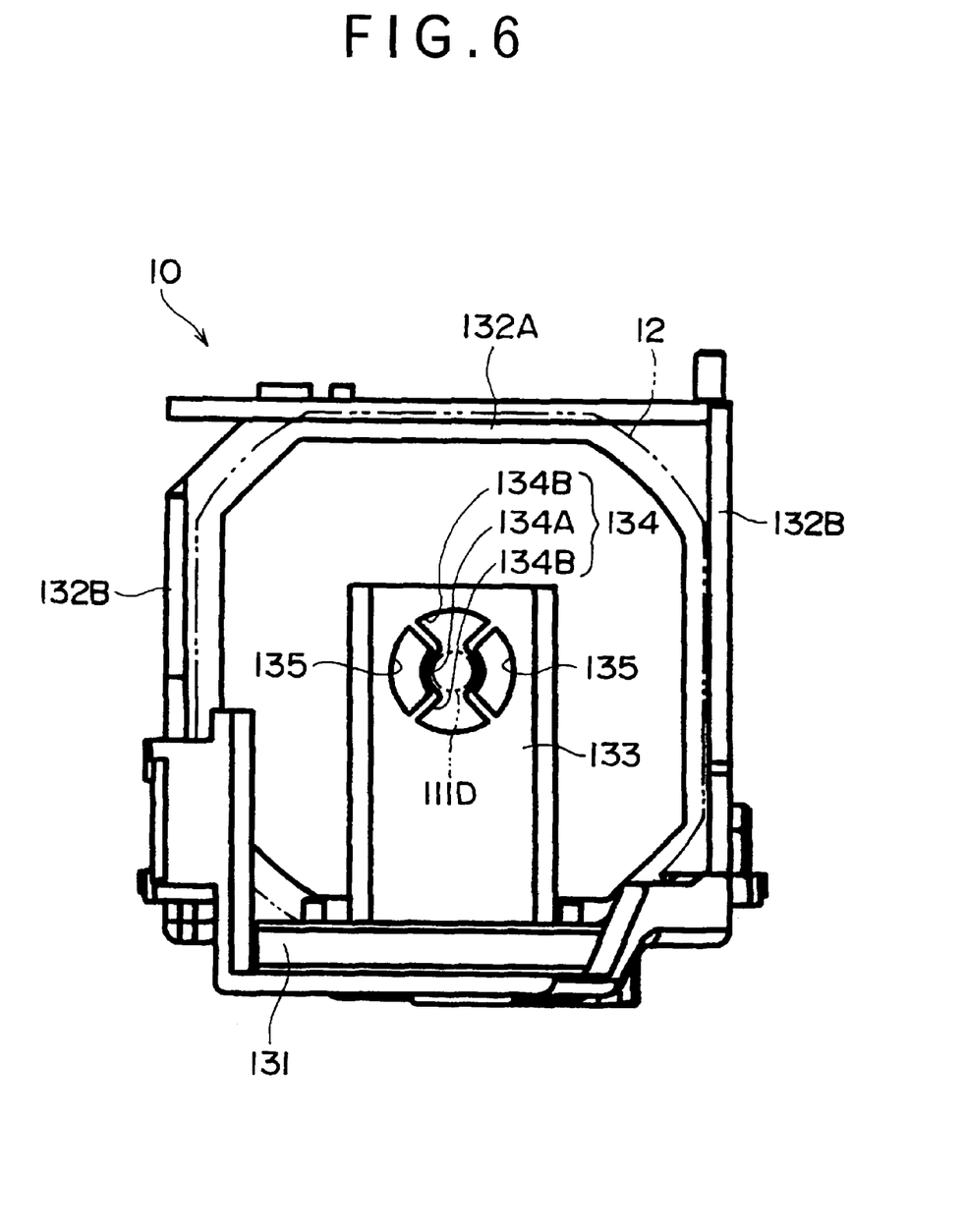
FIG. 6 is a rear elevational view showing the lamp unit of the aforesaid embodiment.
Figure 7:
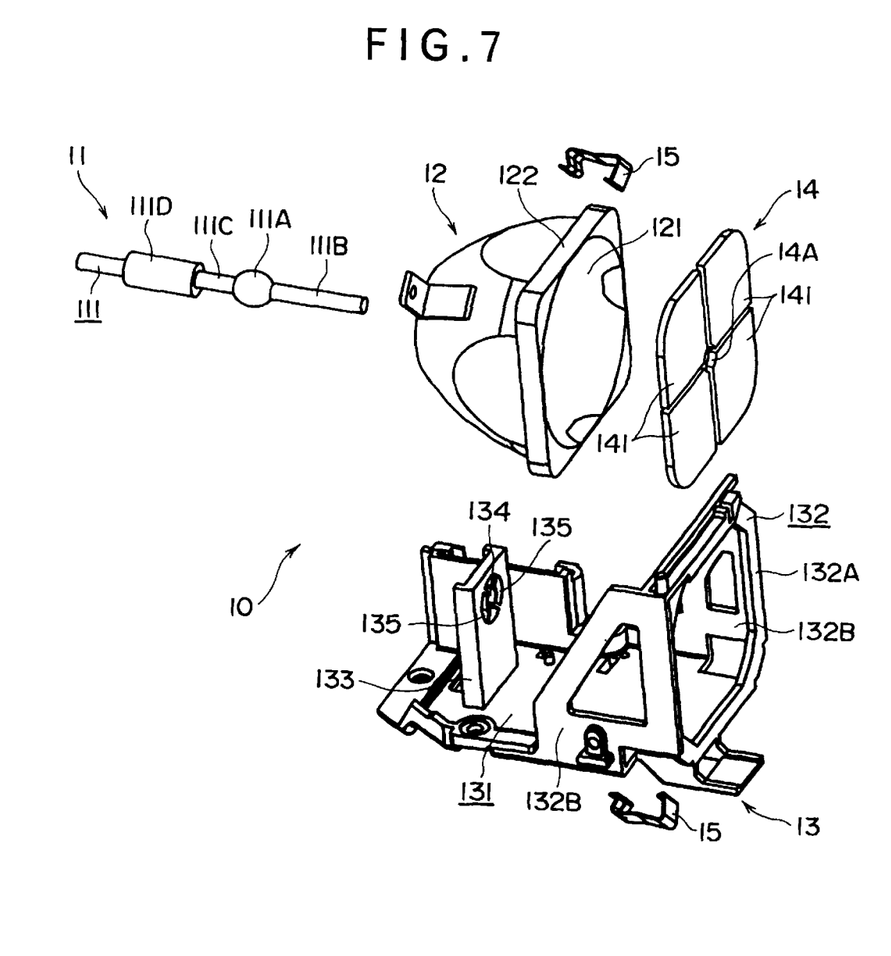
FIG. 7 is an exploded perspective view showing the lamp unit of the aforesaid embodiment.

FIG. 2 is a plan view of the above-described lamp unit 10, FIG. 3 is a side elevational view thereof, FIG. 4 is a vertical cross section thereof, FIG. 5 is a front elevational view thereof, FIG. 6 is a rear elevational view thereof and FIG. 7 is an exploded perspective view thereof, respectively.

The lamp unit 10 is accommodated in a casing (not shown) of a projector 1 and includes the light source lamp 11, the reflector 12 for aligning and irradiating the light beam irradiated by the light source lamp 11, and the lamp housing 13 as a fixing member on which the light source lamp 11 and the reflector 12 are mutually independently fixed.

The light source lamp 11 is, for instance, a high-pressure mercury lamp and includes a glass light-emitting tube 111 and a pair of electrodes (not shown) accommodated inside the light-emitting tube 111.

A light emitting portion 111A at the center of the light-emitting tube 111 is bulged relative to both sides 111B and 111C sandwiching the light emitting portion 111A. The pair of electrodes just oppose inside the light emitting portion 111A so that the light source lamp 11 is lit by the electric discharge between the pair of electrodes.

In the sides 111B and 111C of the light-emitting tube 111, an end of the first side 111B disposed on the left side in FIG. 4 penetrates a below-described protection glass plate 14 as a light transmitting member. On the other hand, a fixing portion 111D is formed on the second side 111C disposed on the right side in FIG. 4, through which the light-emitting tube 111 is supported and fixed to the lamp housing 13.

The reflector 12 is formed in a cup-shape (approximately conic shape) of which inner surface is configured in an oval shape to be a reflection surface 121 as shown in FIG. 4. The reflector 12 is open to left side in the figure (light-emitting side) and the bottom is disposed on the right side in the figure.

A flange 122 for attaching the reflector 12 to the lamp housing 13 is formed on the periphery of the opening of the reflector 12. An insert hole 123 for the light source lamp 11 to be inserted is formed at the center of the bottom of the reflector 12.

In the reflector 12, the second side 111C of the light-emitting tube 111 is inserted to the insert hole 123 while the light emitting portion 111A of the light-emitting tube 111 is disposed in the reflector 12. The disposition of the light-emitting tube 111 and the reflector 12 is adjusted so that the center of light emission in the light emitting portion 111A comes to the focus position of the reflector 12. Incidentally, the center of light emission refers to a position approximately at the center of an electric discharge channel generated between the pair of electrodes in the light-emitting tube 111.

The lamp housing 13 has a base 131 attached to a casing (not shown) of the projector 1, a reflector holder 132 and a light source lamp holder 133 as a holder of the present invention, the reflector holder 132 and the light source lamp holder 133 vertically provided on the base 131 in an opposing manner, the base 131, the reflector holder 132 and the light source lamp holder 133 being integrally formed.

The reflector holder 132 has a body 132A formed in an approximately rectangular frame (FIG. 5), and two reinforcing members 132B vertically provided on both sides of the body 132A for reinforcing the body 132A and formed in an approximate triangle.

The protection glass plate 14 is disposed at the back of the frame of the body 132A constituting the reflector holder 132.

The protection glass plate 14 is divided in a plurality of pieces, i.e., for instance, in four approximate rectangular small glass plates 141. A through hole 14A is formed at the center of the protection glass plate 14, through which an end of the first end 111B of the light-emitting tube 111 is penetrated.

A peripheral portion of the opening of the reflector 12 is abutted to a backside of the protection glass plate 14 where the body 132A of the reflector holder 132 cannot be attached, so that a clip 15 holding the body 132A of the reflector holder 132, the protection glass plate 14 and the flange 122 of the reflector 12 pushes the flange 122 of the reflector 12 and the protection glass plate 14 against the body 132A of the reflector holder 132, thereby fixing the reflector 12 and the reflector holder 132 to the lamp housing 13. Incidentally, as shown in FIG. 5, two clips 15 are used in the present embodiment, which are respectively disposed on the diagonal line of the protection glass plate 14. The protection glass plate 14 may be fixed on the reflector holder 132 using an adhesive as necessary.

Accordingly, the light-emitting side of the reflector 12 is covered with the protection glass plate 14, so that, even when the light-emitting tube 111 is exploded, the fragments do not scatter to the outside of the reflector 12.

The light source lamp holder 133 is formed in approximately planar C-shape (FIG. 2) and is located at a position remote from the bottom of the reflector 12 attached to the reflector holder 132 by a predetermined distance along a longitudinal direction of the light-emitting tube 111.

Accordingly, the portion between the light emitting portion 111A of the light-emitting tube 111 disposed inside the reflector 12 and the fixing portion 111D of the light-emitting tube 111D supported by the light source lamp holder 133 is exposed to the outside of the reflector 12, so that the heat generated by the light source lamp 11 can be easily escaped therefrom and the portion can be cooled by cooling air.

A support hole 134 for the fixing portion 111D of the light-emitting tube 111 to be inserted and fixed is formed at an approximate center of upper part of the light source lamp holder 133 (see FIG. 6).

The support hole 134 is composed of an approximately circular insert hole 134A for the fixing portion 111D of the light-emitting tube 111 to be inserted and two approximately sectoral adhesive filling holes 134B continuing to the insert hole 134A for adhesive 134C such as cement (see FIG. 4) to be filled. The insert hole 134A and the adhesive filling hole 134B are continuously formed in a direction approximately orthogonal with the insertion direction of the light-emitting tube 111 to the insert hole 134A. Further, the two adhesive filling holes 134B are opposed sandwiching the insert hole 134A.

In the light source lamp holder 133, two approximately sectoral air circulation holes 135 are formed around the insert hole 134A of the support hole 134. The two air circulation holes 135 are opposed sandwiching the insert hole 134A in the same manner as the two adhesive filling holes 134B. However, the air circulation holes 135 are not continued from the insert hole 134A unlike the adhesive filling hole 134B.

By forming the air circulation hole 135 around, the insert hole 135 for the light-emitting tube 111 to be held, the flow of the cooling air around the fixing portion 111D of the light-emitting tube 111 can be enhanced. In other words, since an air circulation channel can be formed around the fixing portion 111D of the light-emitting tube 111, the fixing portion 111D can be efficiently cooled.

Next, an assembly process of the lamp unit 10 of the present embodiment will be described below, Initially, the protection glass plate 14 is attached to the reflector holder 132 of the lamp housing 13 by adhesive etc. Subsequently, the reflector 12 is disposed so that the opening thereof faces the protection glass plate 14 and the reflector 12 is attached to the reflector holder 132 by the clip 15 while the protection glass plate 14 is sandwiched by the reflector 12 and the reflector holder 132. Incidentally, the protection glass plate 14 may be fixed to the reflector holder 132 not by adhering and fixing the protection glass plate 14 to the reflector holder 132 but by sandwiching and holding the protection glass plate with the body 132A of the reflector holder 132 and the flange 122 of the reflector 12.

After attaching the protection glass plate 14 and the reflector 12 to the lamp housing 13, the light source lamp 11 is inserted to the insert hole 134A of the light source lamp holder 133 and the insert hole 12A of the reflector 12 in sequence. Then, after adjusting the center of light emission of the light source lamp 11 to the focus position of the reflector 12 to determine the position of the light source lamp 11 relative to the reflector 12, the adhesive filling hole 134B of the light source lamp holder 133 is filled to fix the light source lamp 11 to the light source lamp holder 133.

According to the above embodiment, follow advantages can be obtained.

(1) Since the light source lamp 11 and the reflector 12 of the lamp unit 10 are respectively independently fixed to the lamp housing 13, the attachment for attaching ad fixing the light source lamp 11 is not necessary to be formed on the reflector 12 as an optical component. Accordingly, the shape of the reflector 12 can be simplified and the accuracy of the reflection surface 121 (especially the bottom of the reflection surface 121) can be easily improved, thereby enhancing illumination of the lamp unit 10.

(2) Since the light source lamp 11 is attached to the lamp housing 13, the support hole 134 having the most suitable shape for supporting and fixing the light source lamp 11 can be easily formed irrespective of complexity there of, thereby sufficiently supporting the light source lamp 11.

(3) Since the portion between the light emitting portion 111A and the fixing portion 111D of the light source lamp 11, in other words, the portion disposed adjacent to the light emitting portion 111A of which temperature is easily raised in lighting the light source lamp 11, is exposed to the outside of the reflector 12, thereby allowing the heat to easily escape from the portion. Accordingly, the portion can be easily cooled, so that the temperature of the light emitting portion 111A can be prevented from becoming too hid thereby lengthening the life of the light source lamp 11.

Further, since the cooling efficiency of the light source lamp 11 can be improved, the temperature control of the light source lamp 11 by the cooling function of the projector 1 by a cooling fan (not shown) etc., thereby improving re-lighting properties of the light source lamp 11, (4) Since the light-emitting side of the reflector 12 is covered with the protection glass plate 14, even when the light-emitting tube 111 of the light source lamp 11 is exploded on account of life thereof, the fragment can be prevented from scattering to the outside of the reflector 12.

(5) Since the protection glass plate 14 is composed of the four small glass plates 141, when the temperature inside the reflector 12 is raised in accordance with temperature increase of the light source lamp 11 in lighting, the crack of the protection glass plate on account of thermal deformation can be prevented.

(6) Since the protection glass plate 14 is fixed or held to the reflector holder 132 of the lamp housing 13, the attachment process thereof can be facilitated as compared to an arrangement attaching the protection glass plate to the opening of the reflector 12. Especially, though a troublesome process for attaching the small glass plate 141 one by one is accompanied since the separate type protection glass plate 14 is used in the present embodiment, workability of the process can be improved by attaching the protection glass plate 14 to the lamp housing 13.

(7) Since the air circulation hole 135 for forming an air circulation channel around the fixing portion 111D of the light source lamp 11 is provided to the light source lamp holder 133 of the lamp housing 13, the fixing portion 111D can be efficiently cooled, thereby lengthening the life of the light source lamp 11.

(8) Since the light source lamp 11 is held by the light source lamp holder 133 of the lamp housing 13 and the air circulation hole 135 is formed to the light source lamp holder 133, the shape of the reflector 12 can be prevented from being complicated and the air circulation hole 135 can be easily formed.

Incidentally, the scope of the present invention is not restricted to the above-described embodiment, but may include a modification and improvement as long as an object of the present invention can be achieved.

For instance, though the air circulation channel is formed around the fixing portion 111D of the light source lamp 11 by providing the air circulation hole 135 to the light source lamp holder 133, the air circulation channel may not be necessarily formed, and such arrangement is within the scope of the present invention. However, the light source lamp 11 can be more efficiently cooled by providing the air circulation channel.

Though the protection glass plate 14 is fixed to the lamp housing 13, the protection glass plate 14 may be directly fixed to the opening of the reflector as in the conventional arrangement.

The protection glass plate 14 may be a separate type as in the above-described embodiment or, alternatively, may be an integrated type. The protection glass plate of the separate type is not restricted to be separated in four, but may be separated in two, three or more than four.

Though the through hole 14A of the separate type protection glass plane 14 is formed in an approximate circular shape, a corner of the respective four small glass plate 141 may be cut in a triangle shape and the four small glass plates 141 may be combined so that cut portions are concentrated to the center of the protection glass plate 14, so that an approximate square through hole 14A is formed at the center of the protection glass plate 14. According to this arrangement, the through hole 14A can be easily formed to the protection glass plate 14 and crack generation can be prevented in processing the through hole 14A.

Though the protection glass plate 14 for covering the light-emitting side of the reflector 12 is provided in the above-described embodiment, the lamp unit according to the present invention is not restricted to the arrangement and the protection glass plate may not be provided.

Though the lamp housing 13 having integrated base 131, reflector holder 132 and the light source lamp holder 133 is used in the above-described embodiment, a separate type lamp housing having independent body of the base 131, the reflector holder 132 and the light source lamp holder 133 may be used.

According to the above arrangement, the lift source lamp 11 can be detached from the base 131 together with the light source lamp holder 133 or the reflector 12 can be detached together with the reflector 132, so that the light source lamp 11 and the reflector 12 can be separated even after the lamp unit 10 is assembled.

By using the separable arrangement, the light source lamp 11 can be solely exchanged when the life of the light source lamp 11 is exhausted. Further, the fixing portion 111D of the light source lamp 11 cam be made unnecessary, and the first side 111C may be used as the fixing portion.

On the other hand, when illumination is found inferior after assembling the lamp unit 10, one of the light source lamp 11 and the reflector 12, the light source lamp for instance, is detached from the base 131 together with the light source lamp holder 133 and a new light source lamp holder 133 is attached to the base 133. Subsequently, a new light source lamp 11 is inserted to the support hole 134 of the light source lamp holder 133, which is fixed by cement etc. after positioning relative to the reflector 12.

According to the above arrangement, the relative position of the light source lamp 11 and the reflector 12 can be adjusted (alignment adjustment) after assembling the lamp unit 10, so that the illumination can be improved by exchanging one of the light source lamp 11 and the reflector 12.

Accordingly, when the above failure is caused to the lamp unit 10, only one of the light source lamp 11 and the reflector 12 can be detached from the base 131 together with the holders 133 and 132 in order to exchange, thereby conducting the exchange work economically.

The projector of the present invention is not limited to those having a crystal liquid panel as an optical modulator, but may be those having an optical modulator of plasma element and micro mirror, having a reflective optical modulator for reflecting and modulating the incident light before emitting, and single-plate type, double-plate type and rear type. In other words, any arrangement is possible in implementing the present invention as long as the light beam irradiated from the source lamp is modulated in accordance with image information to form an optical image and the optical image is enlarged and projected by the projector.

What is claimed is:

1. A lamp unit comprising:
a light source lamp having a light emitting portion and a fixing portion;
a reflector disposed with the light emitting portion thereinside that reflects a light beam irradiated by the light emitting portion;
a fixing member including a lamp holder to which the fixing portion of the light source lamp is fixed and held and a reflector holder to which the reflector is fixed and held; and
wherein the lamp holder and the reflector holder are spaced apart to provide an air gap between each other in a light emitting direction;

wherein the light source lamp and the reflector are respectively fixed to the fixing member in a mutually independent manner; and wherein a portion of the light source lamp between the fixing portion and the light emitting portion is exposed to an outside of the reflector.

2. The lamp unit according to claim 1, further comprising:

a protective light transmitting member is provided on a light-emitting side of the reflector.

3. The lamp unit according to claim 2, wherein the light transmitting member is divided in plural parts.

4. The lamp unit according to claim 2, wherein the light transmitting member is fixed to the fixing member.

5. The lamp unit according to claim 1, wherein an air circulation channel penetrates the lamp holder.

6. A projector comprising a lamp unit according to claim 1.

7. The projector according to claim 6, further comprising:

a protective light transmitting member is provided on a light-emitting side of the reflector.

8. The projector according to claim 7, wherein the light transmitting member is divided in plural.

9. The projector according to claim 7, wherein the light transmitting member is fixed to the fixing member.

10. The projector according to claim 6, wherein an air circulation channel penetrates the lamp holder.

11. A fixing method of a light source lamp that irradiates light beam and a reflector that reflects the light beam from the light source lamp, comprising the steps of:

preparing a fixing member including a lamp holder to which the light source lamp is fixed and held and a reflector holder to which the reflector is fixed and held;

spacing both of the holders apart to provide an air gap between each other in a light emitting direction;

fixing one of the light source lamp and the reflector to the fixing member;

positioning the other one of the light source lamp and the reflector relative to the one of the light source lamp and the reflector; and fixing the other one of the light source lamp and the reflector to the fixing member in a mutually independent manner.

12. An assembling method of a lamp unit including a light source lamp that irradiates light beam, a reflector that reflects the light beam from the light source lamp and a fixing member including a lamp holder to which the light source lamp is fixed and held and a reflector holder to which the reflector is fixed and held, comprising the steps of:

spacing both of the holders apart to provide an air gap between each other in a light emitting direction fixing one of the light source lamp and the reflector to the fixing member;

positioning the other one of the light source lamp and the reflector relative to the one of the light source lamp and the reflector; and fixing the other one of the light source lamp and the reflector to the fixing member in a mutually independent manner.

* * * * *